US010375536B2

(12) United States Patent
Bouvet

(10) Patent No.: US 10,375,536 B2
(45) Date of Patent: Aug. 6, 2019

(54) METHOD FOR MANAGING SMS TEXT MESSAGES WITHIN A NETWORK AND GATEWAY IMPLEMENTING SUCH A METHOD

(71) Applicant: ORANGE, Paris (FR)

(72) Inventor: Bertrand Bouvet, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/780,039

(22) PCT Filed: Nov. 22, 2016

(86) PCT No.: PCT/FR2016/053039
§ 371 (c)(1),
(2) Date: May 30, 2018

(87) PCT Pub. No.: WO2017/093632
PCT Pub. Date: Jun. 8, 2017

(65) Prior Publication Data
US 2018/0376298 A1 Dec. 27, 2018

(30) Foreign Application Priority Data
Nov. 30, 2015 (FR) ...................... 15 61556

(51) Int. Cl.
*H04W 4/00* (2018.01)
*H04W 4/14* (2009.01)
(Continued)

(52) U.S. Cl.
CPC ......... *H04W 4/14* (2013.01); *H04L 29/06197* (2013.01); *H04L 29/06217* (2013.01);
(Continued)

(58) Field of Classification Search
CPC ....................................................... H04W 4/14
(Continued)

(56) References Cited

U.S. PATENT DOCUMENTS

2005/0282565 A1  12/2005  Shaheen
2006/0046752 A1  3/2006  Kalavade

FOREIGN PATENT DOCUMENTS

WO    2012164551 A2    12/2012

OTHER PUBLICATIONS

International Search Report dated Jan. 31, 2017 for corresponding International Application No. PCT/FR2016/053039, filed Nov. 22, 2016.

(Continued)

*Primary Examiner* — Charles T Shedrick
(74) *Attorney, Agent, or Firm* — David D. Brush; Westman, Champlin & Koehler, P.A.

(57) ABSTRACT

A method for managing SMS text messages that is implemented by a gateway placed across the flow between an S-CSCF entity and an HLR entity in a telecommunications network. The method includes: receiving a Third Party Registration frame including an identifier of a terminal; sending a configuration message to the HLR entity, the configuration causing the SMS text messages intended for the terminal to transit via the gateway or not; obtaining, from the frame, information representative of the type of access network to which the terminal is connected, wherein the sending and content of the configuration message are determined according to the type of access network.

15 Claims, 12 Drawing Sheets

(51) Int. Cl.
    *H04L 29/06* (2006.01)
    *H04W 60/04* (2009.01)
    *H04W 60/06* (2009.01)
    *H04W 88/16* (2009.01)

(52) U.S. Cl.
    CPC ...... *H04L 29/06251* (2013.01); *H04L 65/102* (2013.01); *H04L 65/1063* (2013.01); *H04W 60/04* (2013.01); *H04W 60/06* (2013.01); *H04W 88/16* (2013.01)

(58) Field of Classification Search
    USPC .......................................................... 455/466
    See application file for complete search history.

(56) References Cited

OTHER PUBLICATIONS

English translation of the International Written Opinion dated Jan. 31, 2017 for corresponding International Application No. PCT/FR2016/053039, filed Nov. 22, 2016.
Gonzalo Camarillo et al., "Chapter 5 Session Control in the IMS" In: "The 3G IP Multimedia Subsystem (IMS): merging the Internet and the Cellular Worlds", Aug. 24, 2011 (Aug. 24, 2011), Wiley Chichester, XP055340567.
Alcatel-Lucent, IMS Entity to Retrieve Location Information:, 3GPP Draft; S2-111720 Netloc—Which IMS Entity to Retrieve Location, 3rd Generation Partnership Project (3GPP), Mobile Competence Centre; 650, Route des Lucioles; F-06921 Sophia-Antipolis Cedex; France, vol. SA WG2, no. Bratislava; 20110411, Apr. 6, 2011 (Apr. 6, 2011_, XP050524623.

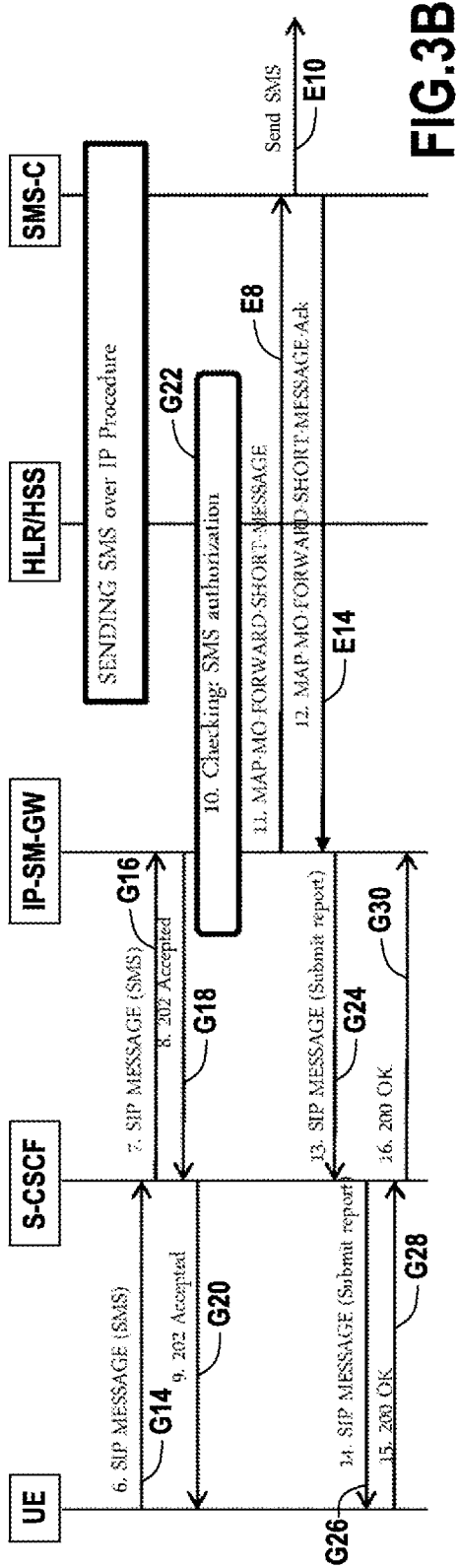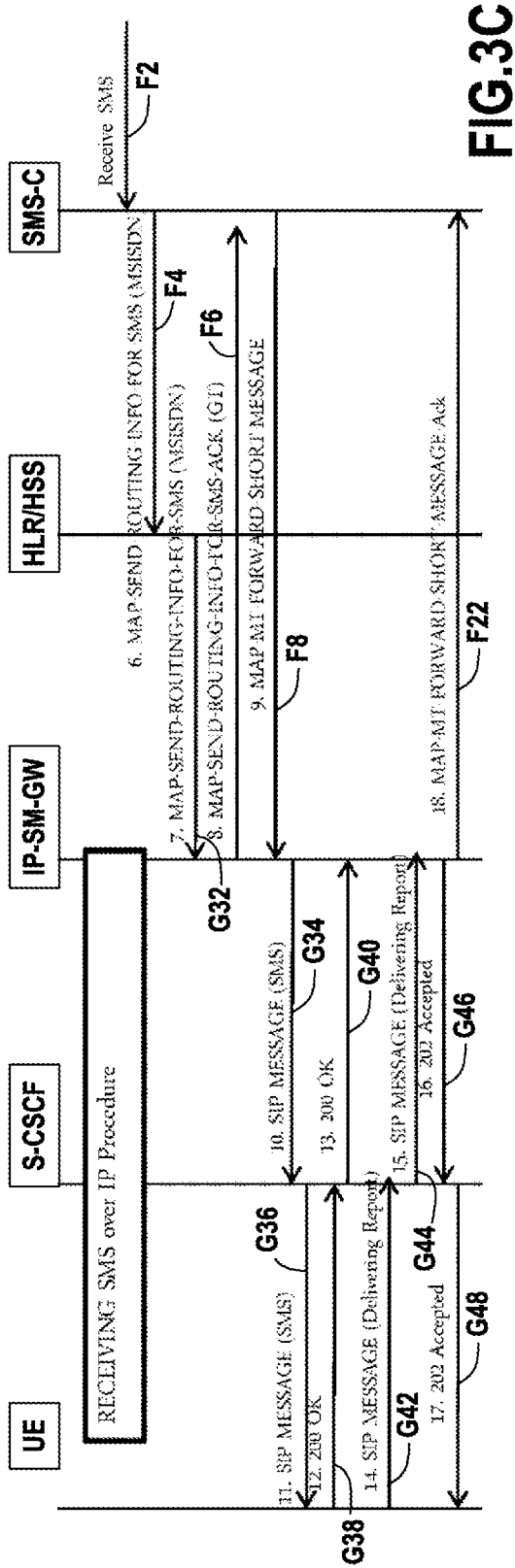

METHOD FOR MANAGING SMS TEXT MESSAGES WITHIN A NETWORK AND GATEWAY IMPLEMENTING SUCH A METHOD

CROSS-REFERENCE TO RELATED APPLICATIONS

This Application is a Section 371 National Stage Application of International Application No. PCT/FR2016/053039, filed Nov. 22, 2016, which is incorporated by reference in its entirety and published as WO 2017/093632 A1 on Jun. 8, 2017, not in English.

BACKGROUND

The present invention is situated in the field of telecommunications, and more particularly in the field of WiFi and 4G/3G/2G mobile networks for SMS ('Short Message Service' in English) short message sending and receiving services.

With regard to 2G and 3G access networks, the telephony service and the SMS message sending and receiving service are available in what is called circuit-switched (CS) mode in English.

FIGS. 1A and 1B illustrate the procedures for sending and receiving SMS messages in circuit-switched mode over a 2G/3G cellular access network. These figures schematically show:

- A mobile terminal UE;
- A mobile switching center V-MSC corresponding to the current location of this terminal (visited Mobile Switching Center in English), 'V-MSC' hereinafter;
- What is termed a visitor location register VLR in English, 'VLR' hereinafter;
- What is termed a home location register HLR in English, 'HLR' hereinafter;
- What is termed a short message service center SMS-C in English, 'S-MSC' hereinafter;
- An SMS gateway GMSC, 'gateway GMSC' hereinafter.

The sending of an SMS message using a mobile terminal UE (SM-MO 'Short Message Mobile Originated' service) is now described with reference to FIG. 1A.

It is assumed in this case that the mobile terminal UE has already attached to the cellular network via the IMSI Attach procedure, and in particular that the VLR has downloaded the profile of the terminal UE from the HLR.

During a step E2, the terminal UE sends the SMS message to the V-MSC, using the command SMS-SUBMIT.

During a step E4, the V-MSC transmits, to the VLR with which it is associated (hereinafter 'register VLR'), a message MAP-SEND-INFO-FOR-MO-SMS so as to ask it for the MSISDN number of the terminal UE and to verify, from the profile of the user of this terminal, that there is no restriction imposed on this user.

The VLR returns an affirmative acknowledgement MAP-SEND-INFO-FOR-MO-SMS-ACK to the V-MSC during a step E6.

If this acknowledgement is affirmative, the V-MSC sends (step E8) the SMS message to the SMS-C, using the message MAP-MO-FORWARD-SHORT-MESSAGE. This message contains the MISDN number of the terminal UE, the MSISDN number of the recipient entered by the user, the number of the SMS-C stored in the SIM card of the terminal UE, and the characters of the SMS message to be transmitted.

The SMS-C stores the message and the MSISDN numbers of the sender and of the recipient and then sends the SMS message to the recipient during a step E10. It receives an affirmative response of sending of the SMS message (step E12).

During a step E14, the SMS-C includes the transmission report in a message MAP-MO-FORWARD-SHORT-MESSAGE-ACK destined for the V-MSC, and the V-MSC returns a message SMS-STATUS-REPORT to the mobile terminal UE (step E16).

The reception of an SMS message originating from the SMS-C(SM-MT 'Short Message Mobile Terminated service) by a mobile terminal UE is described with reference to FIG. 1B.

During a step F2, the gateway GMSC receives an SMS message originating from a center SMS-C.

During a step F4, the gateway GMSC asks the HLR for routing information for the SMS message via the request MAP-SEND-ROUTING-INFO-FOR-SMS. This request in particular contains the MSISDN number of the recipient terminal.

During a step F6, the HLR returns, to the gateway GMSC, via the message MAP-SEND-ROUTING-INFO-FOR-SMS-ACK, the routing information corresponding to the address of the V-MSC in charge of the recipient terminal, as well as the IMSI number of this recipient terminal.

During a step F8, the gateway GMSC sends the message MAP-MT-FORWARD-SHORT-MESSAGE to the V-MSC.

During a step F10, the V-MSC transmits a request MAP-SEND-INFO-FOR-MT-SMS to its local VLR for the purpose of obtaining information relating to the recipient, this request including the IMSI number of the recipient terminal.

From the IMSI number, the VLR identifies what is called the location area in English, or LA, of the recipient terminal.

During a step F12, the VLR initiates a paging procedure (MAP-PAGE) consisting in carrying out a search over the entire area where the recipient terminal for the SMS message is liable to be located. If the VLR does not know the identity of the recipient, a message MAP-SEARCH-FOR-SUBSCRIBER is transmitted so as to launch the search procedure over all of the locations LA that are dependent on the V-MSC. In the case of FIG. 1B, the identity of the recipient terminal is assumed to be known to the V-MSC. The paging procedure is initiated by the VLR, but carried out by the V-MSC.

The V-MSC carries out the paging procedure over the location area LA of the recipient during a step F14; the recipient terminal responds affirmatively to this paging procedure during a step E16.

During a step F18, the VLR returns a response MAP-SEND-INFO-FOR-MT-SMS-ACK to the V-MSC, authorizing the latter to relay the SMS message to the recipient terminal.

During a step F20, the V-MSC routes the SMS message to the recipient mobile terminal via the message SMS-DELIVER, and receives an acknowledgement report SMS-STATUS-REPORT.

During a step F22, the V-MSC includes the delivery report of the SMS message to the recipient terminal in the response MAP-MT-FORWARD-SHORT-MESSAGE-ACK returned to the gateway GMSC.

The SMS gateway GMSC transfers this report to the SMS-C during a step F24.

When the mobile terminal UE is connected to a 4G cellular network, and the VoLTE (Voice over Long Term Evolution) service is not available either because the telecommunications operator does not have this service or the subscription of the client does not authorize this service or the terminal of the client does not yet have this functionality, it uses the fallback mode CS FallBack to receive and transmit telephone calls.

In accordance with this mode, the 4G network asks the mobile terminal UE to switch, when such a network is available, to a 2G or 3G network to process the call. Then, at the end of communication, the mobile terminal UE switches back to the 4G network if the latter is available.

This fallback procedure CS Fallback is relatively burdensome and, in any case, poorly suited to sending and receiving SMS messages.

In a known manner and as shown in FIG. 2A, the terminal under 4G coverage asks, in order to send and receive SMS messages, to attach to the network in 'Combined IMSI Attach' mode (step K1).

This figure shows:
What is termed a mobility management entity in English, 'MME' hereinafter;
What is termed an enhanced mobile switching center in English, MSC-e hereinafter.

In accordance with the Combined IMSI Attach procedure, when the terminal attaches to the 4G network, it sends an explicit Combined Attach request to its MME attachment device. Upon reception of such a command, the MME identifies the enhanced mobile switching center MSC-e of the area local to the terminal and sends to it a request such that it takes charge of the SMS messages of this terminal.

Upon reception of this command, the MSC-e sends a MAP protocol command to the HLR, such that the latter routes the SMS messages destined for the terminal UE via this MSC-e.

The sending of an SMS message in accordance with the Combined Attach procedure (or SMSoSGs) is described with reference to FIG. 2B. In accordance with this procedure, when the terminal UE wishes to send an SMS message, it encapsulates this SMS message in a message of the NAS (Network Access Stratum) layer destined for the MME (step G2).

The MME transmits this message via the SGs interface to the MSC-e selected during the Combined IMSI attach network attachment phase (step G4), and then the MSC-e sends the SMS message in circuit-switched mode, as if this SMS message had been sent using a 2G/3G cellular radio access.

Steps similar to steps E8 to E14, already described with reference to FIG. 1A, are in particular implemented.

FIG. 2C recalls, in the same way, the known procedure of receiving an SMS message in Combined Attach mode (or SMSoSGs); this is not described in detail here.

The Combined Attach procedure has the advantage of being much more flexible than the fallback procedure CS fallback used to manage telephone calls. In particular, it allows clients attached to 4G to remain on 4G to transmit and receive SMS messages, and therefore does not disrupt client experience by way of a significant throughput reduction, for example when the client is streaming a video.

On the other hand, it requires a development of the V-MSC to support the SGs interface, and imposes an additional load on the V-MSC.

This procedure furthermore has the drawback of not being applicable to terminals that have only WiFi coverage.

It is in particular to rectify this drawback that the 3GPP standardized the mode for sending and receiving SMS messages over an IP network (SMS over IP or 'SMSoIP' in English), which mode is able to be used in the packet-switched PS domain, that is to say both under 4G cellular network coverage with VxLTE (Voice-Video-etc over LTE) service support and under WiFi coverage with VxWiFi (Voice-Video-etc over WiFi) service support.

The known operation of SMSoIP mode is recalled with reference to FIGS. 3A to 3C. These figures show a gateway for managing SMS messages over an IP network (Internet Protocol Short Message Gateway in English), 'gateway IP-SM-GW' hereinafter.

Once the terminal UE has attached to the 4G cellular network (step G2), the latter registers (step G4) via the SIP protocol in the IMS subsystem, that is to say as far as the S-CSCF.

The S-CSCF extends the SIP registration as far as the gateway IP-SM-GW via the SIP Third Party Registration procedure (step G6).

The SIP registration message transmitted to the gateway IP-SM-GW contains, in the AoR (Address of Record) field, the public identity of the terminal UE, namely its MSISDN number.

This gateway IP-SM-GW has a SIP interface; this may be collocated in the Telephony Application Server application server, in an SMS-C, or in an independent device. Regardless of its implementation, the gateway IP-SM-GW is seen from the IMS core as an application server AS.

After having received the SIP registration message, the gateway IP-SM-GW is optionally able to subscribe (step G8) to the Event Package Reg (for Registration), so as to be informed immediately when the terminal UE is no longer registered in the IMS network core (S-CSCF).

During a step G10, if the contact address AoC supplied by the terminal contains information that it supports the SMS over IP functionality, the gateway IP-SM-GW sends, to the HLR, via a MAP interface, a message MAP ATM (Any Time Modification) request so as to tell it that the SMS messages destined for the terminal UE with the MSISDN number now have to be routed via the gateway IP-SM-GW, and no longer via the V-MSC.

The HLR confirms that the address of the gateway IP-SM-GW has been accepted during a step G12.

The sending of an SMS message in SMSoIP mode is recalled with reference to FIG. 3B.

During a step G14, the SMS message is encapsulated by the terminal UE in a message SIP MESSAGE destined for the S-CSCF (via the P-CSCF, not shown in the figures for the sake of simplicity).

The message SIP MESSAGE is transmitted to the gateway IP-SM-GW (step G16); the gateway IP-SM-GW acknowledges reception of the message SIP MESSAGE by sending a response 202 Accepted to the S-CSCF (step G18). The S-CSCF relays the response 202 Accepted to the terminal UE, via the P-CSCF (step G20).

During a step G22, the gateway IP-SM-GW consults the HLR to verify whether the terminal UE has the rights to send an SMS message.

If sending of an SMS message is authorized, the gateway IP-SM-GW decapsulates the SMS message from the message SIP MESSAGE and re-encapsulates it in a MAP message MAP-MO-FORWARD-SHORT-MESSAGE to the SMS-C (in a manner similar to step E8, already described). Next, the SMS-C sends the SMS message to the network of the recipient of the SMS message, in a manner similar to step E10, already described.

The SMS-C returns the transmission report of sending of the SMS message via the MAP message MAP-MO-FORWARD-SHORT-MESSAGE-ACK to the gateway IP-SM-GW (in a manner similar to step E14, already described).

During a step G24, the gateway IP-SM-GW decapsulates the transmission report for the SMS message from the MAP message and re-encapsulates it in a message SIP MESSAGE and then sends it to the S-CSCF; the S-CSCF sends the message SIP MESSAGE to the terminal UE, via the P-CSCF (step G26); the terminal UE responds 200 OK to the S-CSCF, via the P-CSCF (step G28), so as to acknowledge reception and acceptance of the message SIP MESSAGE; the S-CSCF relays the response 200 OK to the gateway IP-SM-GW (step G30).

The reception of an SMS message in SMSoIP mode is recalled with reference to FIG. 3C.

As described with reference to FIG. 1B, the SMS message is transmitted by the sender to the SMS-C, which may or may not belong to the operator of the recipient, during a step similar to step F2.

During a step similar to step F4, the SMS-C consults the HLR via the message MAP-SEND-ROUTING-INFO-FOR-SMS so as to supply the SMS-C with the routing information for the SMS message (GT 'Global Title' address of the gateway IP-SM-GW seen as a VLR).

During a step G32, the HLR relays the message to the gateway IP-SM-GW, the gateway having asked, in step G10, for the SMS messages destined for this MSISDN number to be routed to it.

During a step similar to step F6, already described, the gateway IP-SM-GW returns, via the message MAP-ROUTING-INFO-FOR-SMS-ACK, the GT routing information corresponding to the address of the gateway IP-SM-GW.

The SMS-C then routes the SMS message to the gateway IP-SM-GW via the MAP message MAP-MT-FORWARD-SHORT-MESSAGE in a manner similar to step F8, already described.

The gateway IP-SM-GW decapsulates the SMS message from the MAP message and then re-encapsulates it in a message SIP MESSAGE before sending it to the S-CSCF (step G34).

The S-CSCF transmits the message SIP MESSAGE via the P-CSCF as far as the terminal UE (step G36); the terminal UE acknowledges reception of the message SIP MESSAGE by sending the SIP response 200 OK to the S-CSCF (step G38); the S-CSCF relays the SIP response 200 OK to the gateway IP-SM-GW (step G40).

The terminal UE sends, to the S-CSCF, via the P-CSCF, the delivery report for the SMS message via the message SIP MESSAGE (step G42); the S-CSCF relays the message SIP MESSAGE to the gateway IP-SM-GW (step G44).

During a step G46, the gateway IP-SM-GW acknowledges reception of the message SIP MESSAGE via the response 202 Accepted transmitted to the S-CSCF; the S-CSCF relays, via the P-CSCF, the response 202 Accepted to the terminal UE (step G48).

The gateway IP-SM-GW sends the send report for the SMS message to the SMS-C via the MAP message MAP MAP-MT-FORWARD-SHORT-MESSAGE-ACK during a step similar to step F22, already described.

The sending and reception of SMS messages via IP (SMSoIP) may apply to 4G cellular coverage and to WiFi coverage if the terminal has a VxLTE and/or VxWiFi IMS stack and a suitable subscription to the mobile operator.

It will be noted that, when the terminal UE has the VxWiFi service, the only solution that it has for transmitting or receiving SMS messages is to use SMSoIP mode.

This is why, when the terminal registers in the IMS network core (step G4), the gateway IP-SM-GW is notified, via the Third Party Registration mechanism (step G6), such that this gateway IP-SM-GW gives the instruction (step G10) to the HLR to route the incoming SMS messages for this terminal to this gateway IP-SM-GW.

However, if the terminal UE loses WiFi connectivity and switches to 2G/3G or to 4G (with or without VxLTE), then the path taken to receive the SMS message is not optimal in terms of network resources.

This situation will now be illustrated more precisely with reference to FIGS. 4A to 4C.

It is recalled, with reference to FIG. 4A, that when the terminal UE starts up (ON/OFF button of the terminal or after deactivation of flight mode) under WiFi or 4G cellular coverage, it seeks to register using SIP protocol in the IMS network core in accordance with the mutual authentication procedure (step H2).

During this procedure, the registration messages REGISTER include, in a known manner, a SIP field PANI defining the type of access and one of the parameters of which contains the value eUTRAN for 4G access or WLAN for WiFi access.

At the end of the mutual authentication procedure, when the network responds 200 OK (Expire=1H), the terminal is registered in the IMS network core for a period of 1 hour.

In a known manner, the terminal has to reregister (subsequent registrations) after 50 minutes (=Expires–10 minutes).

Once the terminal UE is registered in the IMS network core and in particular with the S-CSCF, the Third Party Registration function makes it possible to notify the gateway IP-SM-GW so as to tell it that the terminal UE is registered in the IMS network core (step H4).

If the terminal indicates that it supports the SMSoIP service in its contact address AoC, the gateway IP-SM-GW then notifies the HLR (step H6) so as to tell it that all of the SMS messages destined for the terminal UE with the MSISDN number corresponding to the AoR ('Address of Record') field have to be routed to this gateway IP-SM-GW and no longer to the center MSC-C to which the terminal UE is tethered in parallel.

If the terminal UE started up on 4G, the terminal implements the reregistration procedure every 50 minutes, and upon each subsequent registration, the S-SCSF informs the gateway IP-SM-GW of the fact that the terminal is still registered.

The HLR is not updated by the gateway IP-SM-GW upon reception of the Third Party Registration frames extending these subsequent REGISTER.

It is assumed, with reference to FIG. 4B, that the terminal UE, which started up on 4G, carries out a handover to the 2G or 3G cellular network. Some terminal providers, on request from the telecommunications operators, may choose to maintain SIP registration under 2G and 3G cellular coverage, so as to optimize protocol exchanges within the telecommunications network and avoid 'ping-pong' effects. Other terminal providers may ask the terminals to deregister explicitly from the IMS network when the terminal is registered under 4G coverage and it performs a handover to 2G or 3G coverage. In this case, the terminal sends an explicit deregistration message to the IMS network (REGISTER with Expires=0). In any case, if the terminal has the 4G VxLTE service and the VxWiFi service, IMS registration is maintained during a 4G to WiFi handover, and vice versa, so as to offer clients service continuity between these two access networks.

If the terminal provider chooses to maintain IMS registration under 2G or 3G coverage, at the time of the following reregistration (step N2) upon expiry of the subsequent reregistration timer (50 minutes with Expires=1 hour), the terminal sends a subsequent REGISTER in which the SIP field PANI is positioned at GERAN or UTRAN, depending on whether the handover has been carried out to a 2G or 3G cellular network.

The gateway IP-SM-GW does not pass on any message to the HLR upon reception of the Third Party Registration frame (step N4).

The mechanism is similar in the case of a handover to a WiFi network, except that the terminal UE does not wait 50 minutes to carry out the subsequent registration (step N6), the field PANI changed to the value WLAN having to be passed on immediately in order for incoming telephone calls to be routed correctly.

The gateway IP-SM-GW does not send any message to the HLR upon reception of the Third Party Registration frame (step N8).

With reference to FIG. 4C, the terminal initially registered on 4G and having undergone a handover to a 2G cellular network deregisters by sending a REGISTER with a value EXPIRES equal to 0 (step N10). This mechanism is the same regardless of the type of connectivity at the time of the deregistration and regardless of the reason for the deregistration, in particular in the case of voluntary deregistration (for example when the user puts his terminal into 'flight mode' or shuts down his terminal via the ON/OFF button) or of deregistration on the initiative of the network.

Upon reception of such a deregistration message, the gateway IP-SM-GW tells the HLR (step J2) to no longer route the incoming SMS messages to the gateway IP-SM-GW, but to the last V-MCS used.

In summary, upon losing WiFi coverage, the terminal UE does not have time to deregister using SIP protocol, even though the gateway IP-SM-GW is belatedly informed of the deregistration of the terminal UE, more precisely upon expiry of the current registration (1 hour maximum) when the S-CSCF sends a message SIP DEREGISTER to the gateway IP-SM-GW (step N10) or via a message NOTIFY RegEvent if the gateway IP-SM-GW has subscribed to the event RegEvent in step G8.

As a result, if an SMS message is destined for the terminal UE, it is systematically routed, throughout this entire period of ambiguity, from the SMS-C to the gateway IP-SM-GW and then from this gateway to the S-CSCF, and then to the recipient terminal UE via the P-CSCF.

However, in this case, as the terminal UE is no longer able to be reached in packet-switched mode PS but only in circuit-switched mode CS, an error code is returned to the gateway IP-SM-GW, either by the S-CSCF or by the P-CSCF.

The gateway IP-SM-GW then uses the mode CS-Retry to interrogate the HLR via the MAP protocol to look for the address of the V-MSC to which the terminal UE is attached (in normal mode for 2G/3G network coverage or in Combined Attach mode for 4G coverage) in order to route the SMS message to this device.

The network resources are therefore not used optimally.

The invention targets a method for managing SMS messages that at least partly rectifies these problems.

Aim and Summary of the Invention

Thus, and according to a first aspect, the invention relates to an SMS message management method, implemented by a gateway positioned in a manner inserted between an S-CSCF entity and an HLR entity in a telecommunications network, said method including:

a step of receiving a Third Party Registration frame including the identifier of a terminal;

a step of sending a configuration message to said HLR entity, said configuration resulting in the SMS messages destined for said terminal transiting or not transiting via said gateway, said method being characterized in that it includes:

a step of obtaining, from said frame, information representative of the type of access network to which said terminal is connected; and in that the sending and the content of said configuration message are determined on the basis of said type of access network.

Correlatively, the invention relates to a gateway positioned in a manner inserted between an S-CSCF entity and an HLR entity in a telecommunications network, said gateway including:

a communication module able to receive a Third Party Registration frame including the identifier of a terminal;

the communication module being able to send a configuration message to said HLR entity, said configuration resulting in the SMS messages destined for said terminal transiting or not transiting via said gateway, said gateway being characterized in that it includes:

an analysis module configured to obtain, from the frame, information representative of the type of access network to which said terminal is connected; and in that the sending and the content of said configuration message being determined on the basis of said type of access network.

Thus, and in general, the invention targets a solution that allows a mobile network operator to choose the communication mode for the SMS messages destined for a terminal by declaring, or not declaring, for this terminal, the gateway for managing the SMS messages over an IP network to the HLR associated with this terminal on the basis of the type of access with which the terminal is accessing the network.

The invention is particularly simple to implement, as only the gateway for managing the SMS messages over an IP network is affected by the invention.

In one particular embodiment, the Third Party Registration frame is a frame notifying the gateway of the fact that the terminal has just registered for the first time in the IMS network core, the gateway sending a message to register with the HLR only if it detects that the terminal is accessing the network in WiFi mode.

The invention thus allows an operator, for a terminal that supports the VxLTE and VxWiFi services, to use SMSoSGs mode when the terminal is using the VxLTE service under 4G coverage and SMSoIP mode when the terminal is using the VxWiFi service under WiFi coverage.

In one particular embodiment, the Third Party Registration frame is a frame notifying the gateway of the fact that the terminal has just registered for the first time in the IMS network core, the gateway sending a message to register with the HLR only if it detects that the terminal is accessing the network in WiFi mode or in 4G mode.

In one particular embodiment, the Third Party Registration frame is a frame notifying the gateway of the fact that the terminal is reregistering in the IMS network core, the gateway sending a message to deregister from the HLR if it detects that the terminal is accessing the network in 2G or 3G mode.

The invention thus avoids the problems of the state of the art, in which the SMS messages destined for a terminal continue to be sent in SMSoIP mode while the terminal is in 2G or 3G CS mode following a handover procedure.

In one particular embodiment, the Third Party Registration frame is a frame notifying the gateway of the fact that the terminal is reregistering in the IMS network core, the gateway sending a message to register with the HLR only if it detects that the terminal is accessing the network in WiFi mode.

This embodiment makes it possible to switch back to SMSoIP mode when the terminal recovers a WiFi connection.

On the part of the terminal UE, it is preferable, but not essential, upon each change of access network (2G, 3G, 4G or WiFi), for the message SIP REGISTER to be sent to the IMS network so as immediately to inform the IMS core, and therefore the IP-SM-GW, of the change of PANI so as to activate/deactivate the SMSoIP service as quickly as possible.

The particular features and advantages of the gateway according to the invention are similar to those presented above for the SMS message management method according to the invention, and they will not be recalled at this juncture.

In one particular embodiment, at least some of the various steps of the SMS message management method are determined by computer program instructions.

As a result, the invention also targets a computer program on an information carrier, this program being able to be implemented on a computer, this program including instructions suitable for implementing steps of an SMS message management method such as described above.

This program may use any programming language, and be in the form of source code, object code, or of intermediate code between source code and object code, such as in a partially compiled form, or in any other desirable form.

The invention also targets a computer-readable information carrier including computer program instructions, such as mentioned above.

The information carrier may be any entity or device capable of storing the program. For example, the carrier may include a storage means, such as a ROM, for example a CD-ROM or a microelectronic circuit ROM, or else a magnetic recording means, for example a hard disk.

Moreover, the information carrier may be a transmissible carrier such as an electrical or optical signal, which may be routed via an electrical or optical cable, by radio or by other means. The program according to the invention may in particular be downloaded from an Internet network.

As an alternative, the information carrier may be an integrated circuit in which the program is incorporated, the circuit being designed to execute or to be used in the execution of the method in question.

BRIEF DESCRIPTION OF THE DRAWINGS

Other features and advantages of the present invention will emerge from the description given below, with reference to the appended drawings which illustrate an exemplary embodiment thereof that is in no way limiting. In the figures:

FIGS. 3A to 3C illustrate procedures for sending and receiving SMS messages in SMSoIP mode, according to the prior art;

DETAILED DESCRIPTION OF ONE EMBODIMENT OF THE INVENTION

An SMS message management method according to one particular embodiment will now be described with reference to FIGS. 5A and 5B.

Figure 1A:
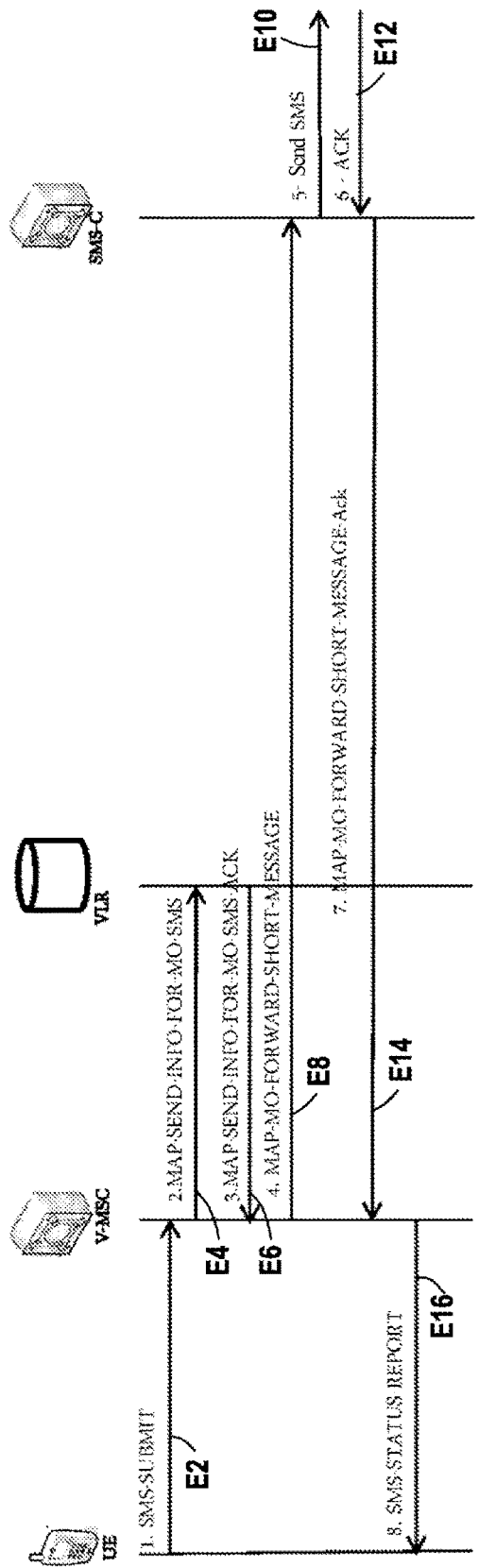
FIGS. 1A and 1B illustrate procedures for sending and receiving SMS messages in circuit-switched mode over a 2G/3G cellular access network, according to the prior art.
Figure 1B:
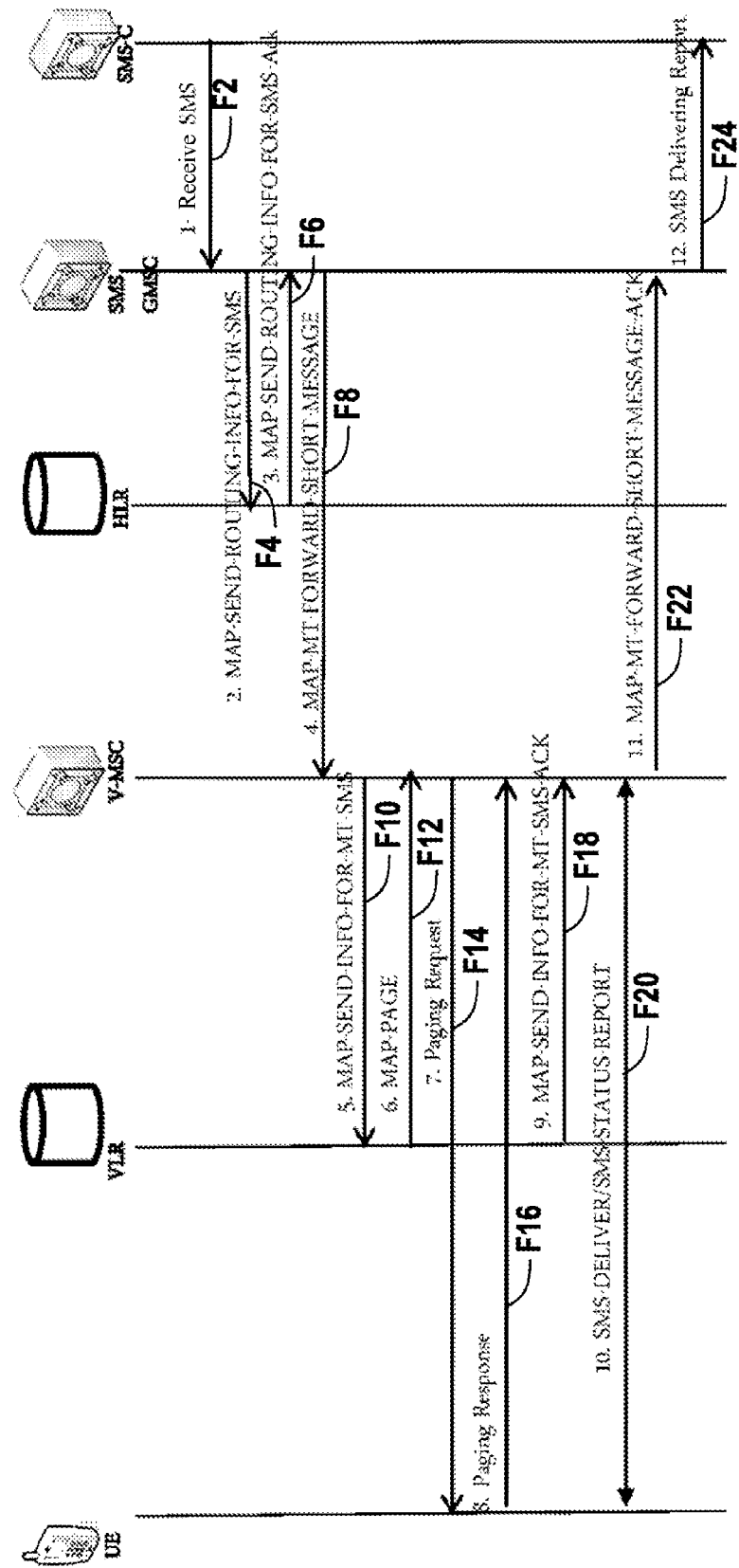
Figures 2A, 2B:
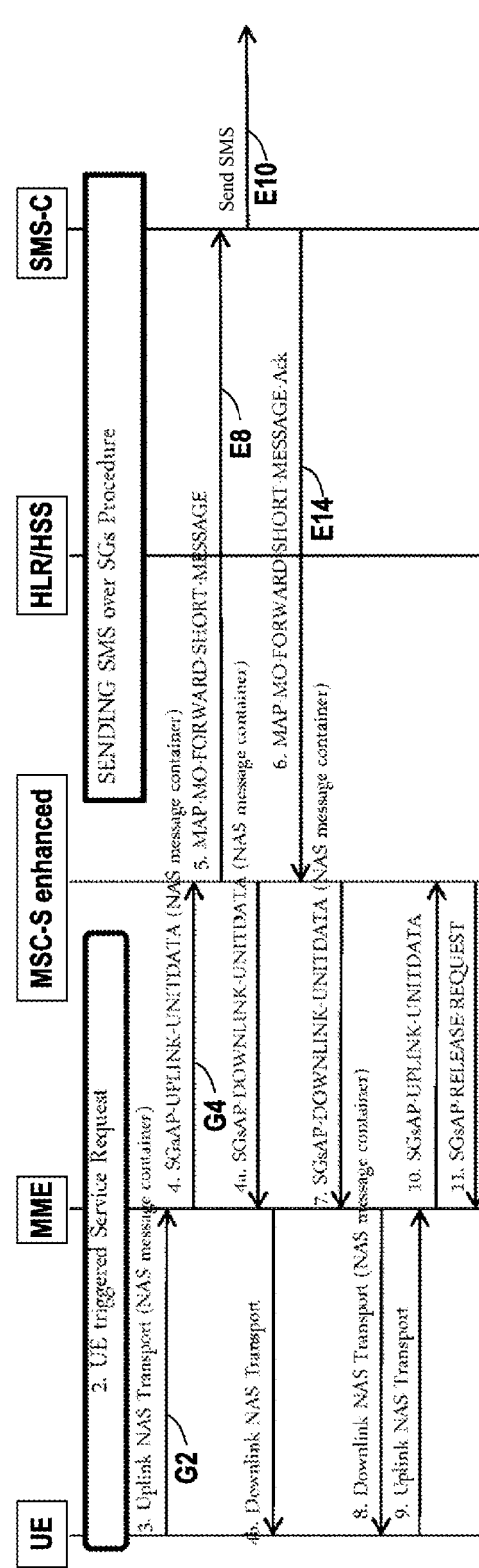
FIGS. 2A to 2C illustrate procedures for sending and receiving SMS messages in SMSoSGs mode, according to the prior art.
Figure 2C:
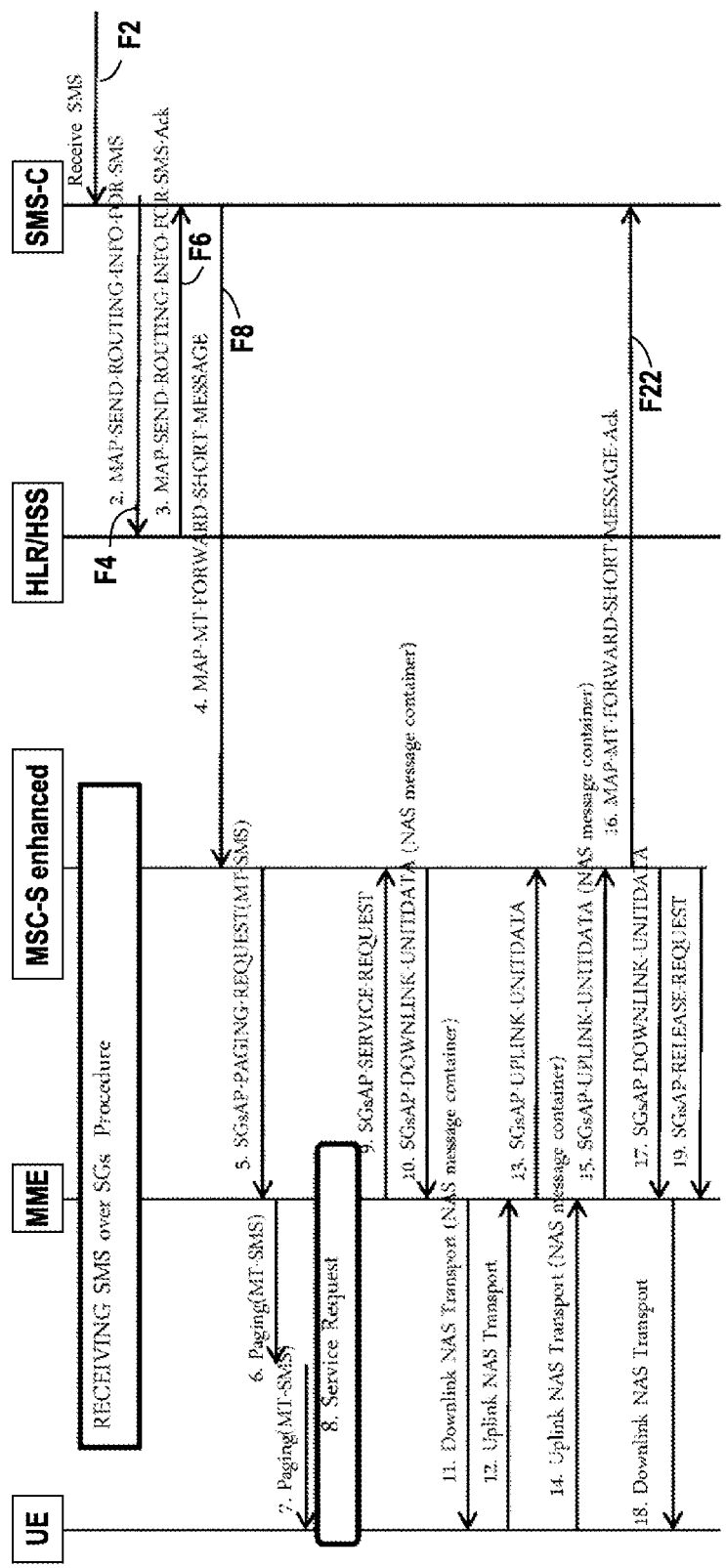
Figure 3A:
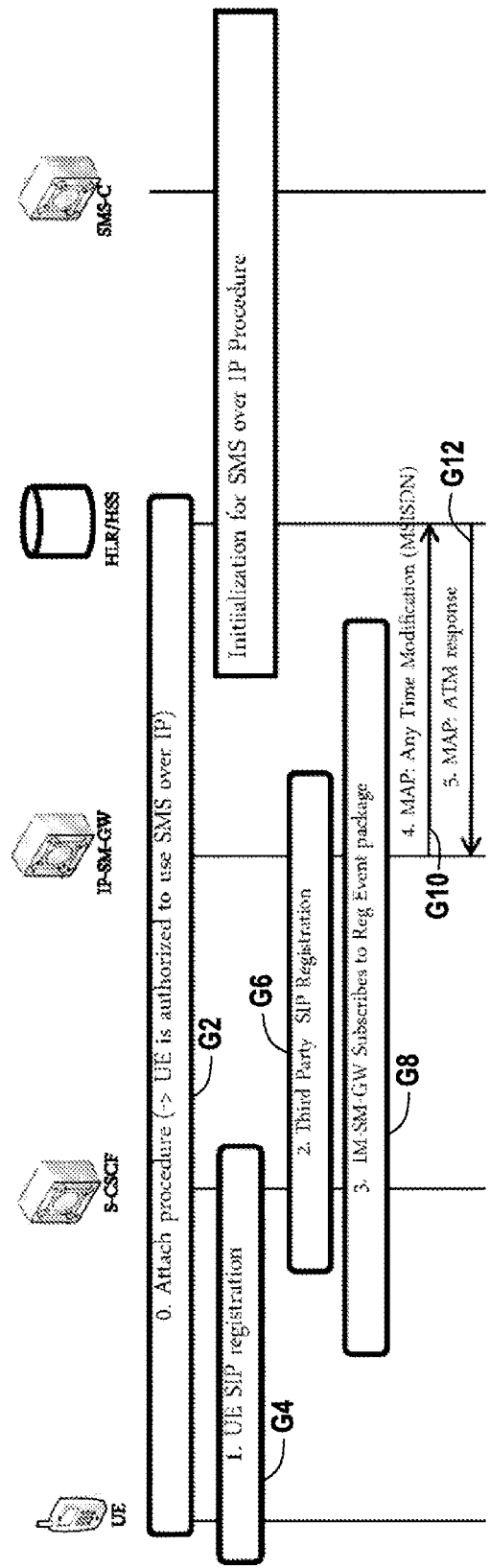
Figure 4A:
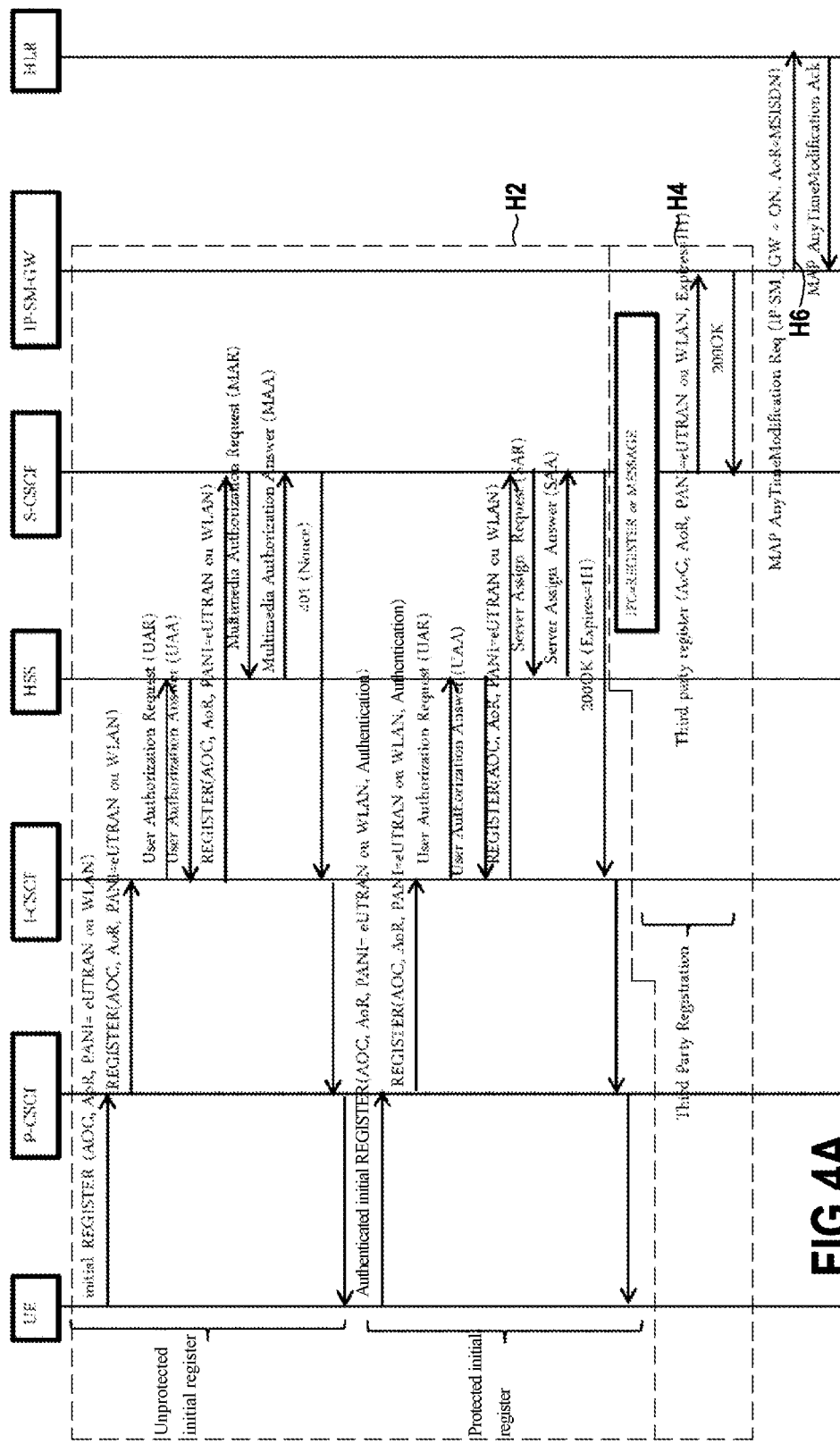
FIGS. 4A to 4C illustrate drawbacks of the SMS message management methods according to the prior art.
Figure 4B:
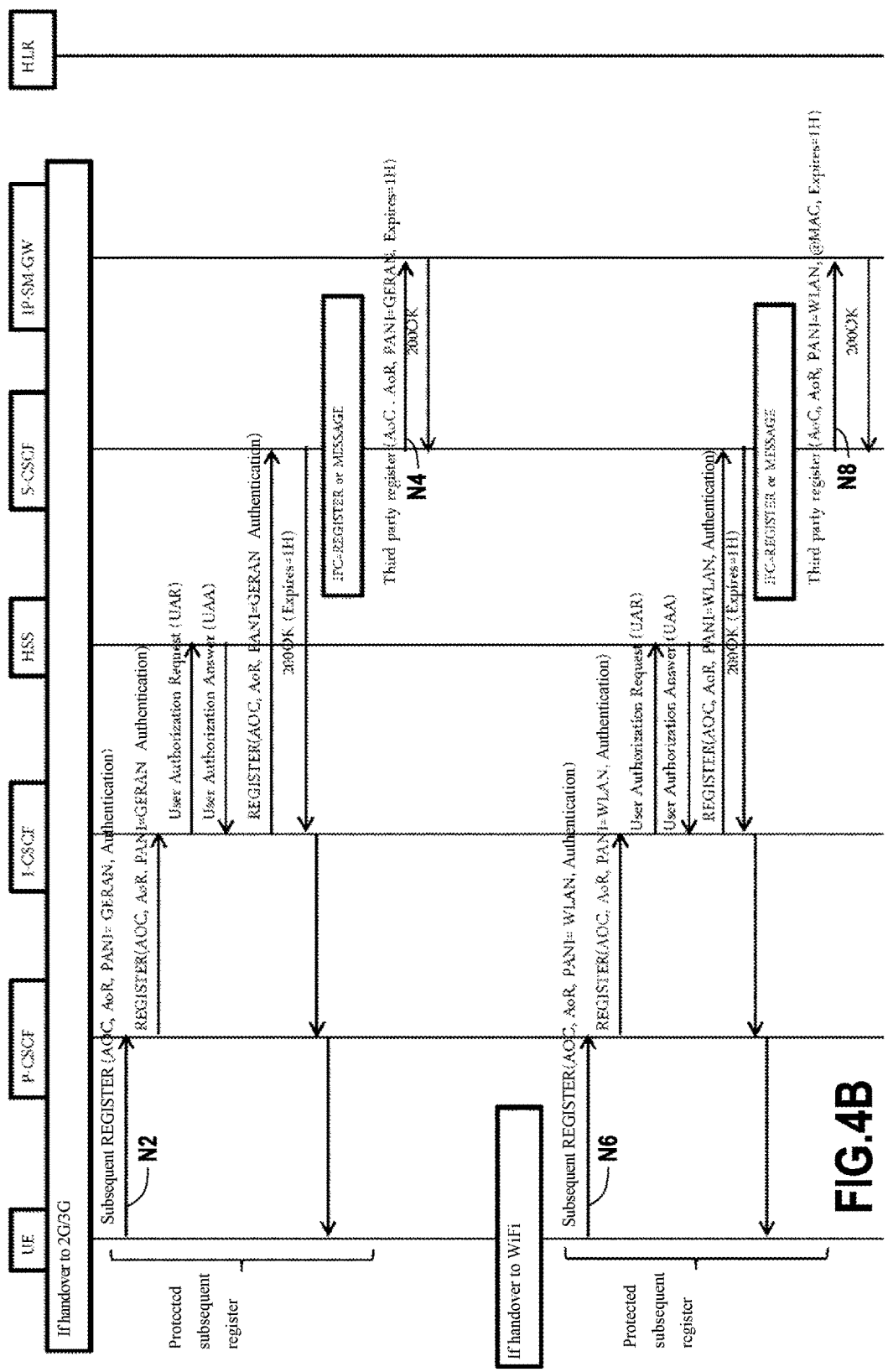
Figure 4C:
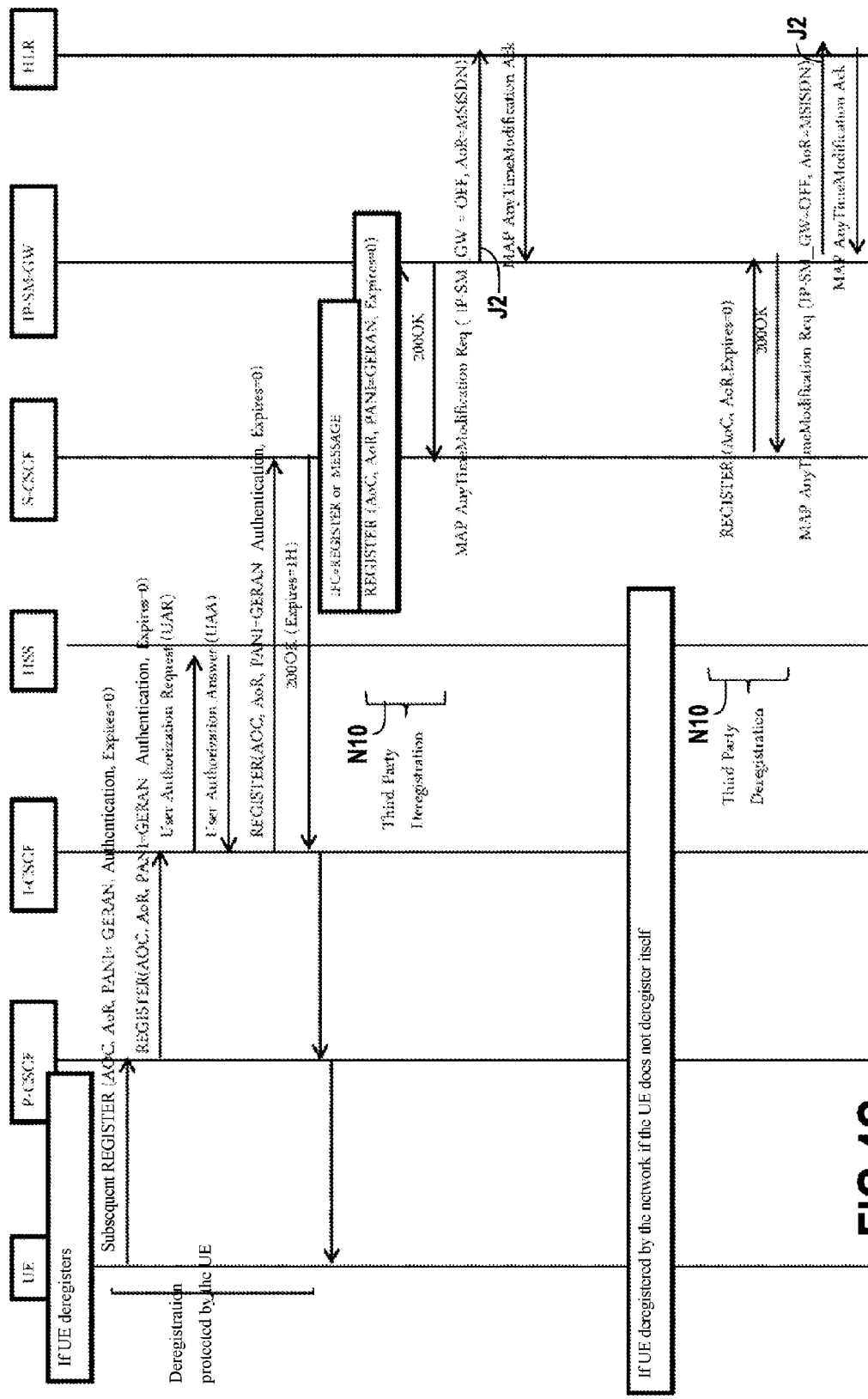
Figure 5A:
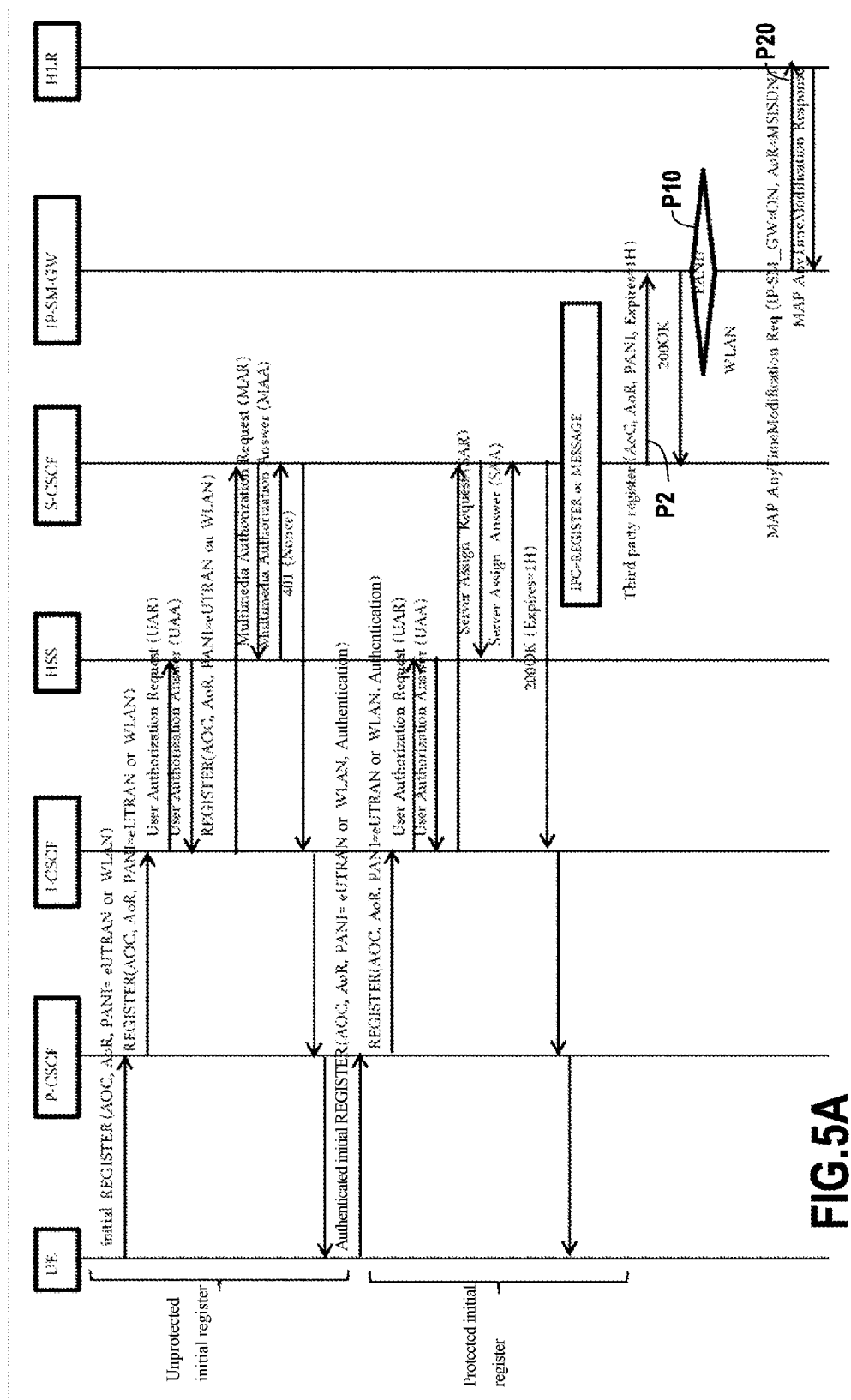
FIGS. 5A and 5B illustrate an SMS message management method according to one particular embodiment of the invention.

With reference to FIG. 5A, consideration is given to a mobile terminal UE with the SMSoIP function activated (its contact address AoC includes SMSoIP support) that initially accesses the network via a 4G or WiFi access network.

In a known manner, the Third Party Registration frame, sent to the gateway IP-SM-WG, includes (step P2) a SIP field PANI whose value is eUTRAN if the terminal establishes access through a 4G network or WLAN if this access is established through a WiFi network.

According to the invention, the gateway IP-SM-WG determines the value of the field PANI during a step P10.

In the embodiment described here, the gateway IP-SM-GW registers with the HLR entity (step P20) only if the PANI includes the value WLAN, representative of the fact that the terminal is connected to a WiFi access network.

This embodiment of the invention makes it possible to optimize use of the network resources.

Specifically, in this embodiment, as soon as the terminal is connected via an access network of another type, for example 4G, the SMS messages destined for this terminal do not transit through the gateway IP-SM-GW. It is recalled that, in this situation, specifically, the terminal mandatorily implemented the Combined Attach procedure at the time that it made its request to attach to the 4G network, such that the HLR has been configured so that the SMS messages destined for this terminal are taken charge of by the MSC-e associated with the local area of the terminal.

In the embodiment described here, if the gateway determines, in step P10, that the terminal is accessing the network in WiFi mode (PANI=WLAN), said gateway registers with the HLR during a step P20 in order that the SMS messages destined for the terminal UE are routed to said gateway. To this end, it sends a configuration message MAP AnyTime-ModificationRequest to activate its address in the HLR for the messages destined for the terminal UE whose MSISDN corresponds to the AoR field.

As a variant, the gateway IP-SM-GW registers with the HLR as soon as it determines, in step P10, that the terminal UE is connected via a 4G or WiFi access network.

Figure 5B:
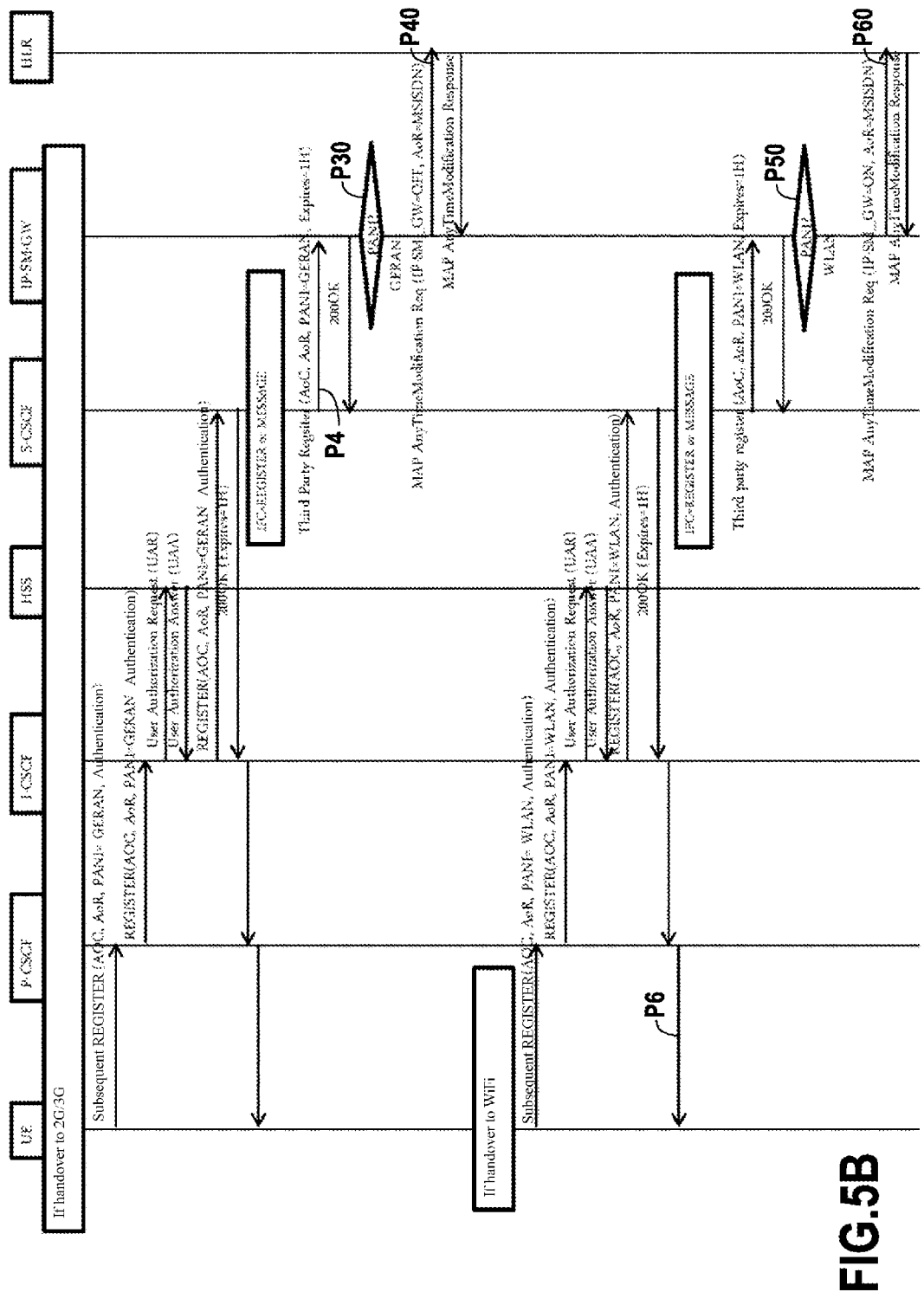

With reference to FIG. 5B, it is assumed that the terminal configured to maintain its IMS registration over all types of access and that was originally registered in WiFi mode has lost its connection and carries out a handover to a 2G cellular network.

With the terminal having initially been registered in WiFi mode, the gateway declared itself to the HLR in order for the SMS messages destined for the terminal UE to be routed to said gateway.

As mentioned above, the subsequent REGISTER following the handover procedure to the 2G network (possibly 50 minutes after the previous one) includes a SIP field PANI whose value is GERAN (step P4).

When the gateway IP-SM-GW receives the Third Party Registration frame, it analyzes this field during a step P30 and determines, in this embodiment of the invention, that it has to deregister from the HLR (step P40). To this end, it sends a configuration message MAP AnyTimeModificationRequest to deactivate its address in the HLR for the messages destined for the terminal UE whose MSISDN corresponds to the AoR field.

The result of this deregistration is that the SMS messages destined for the terminal UE no longer transit through the gateway IP-SM-GW, but via the V-MSC.

With continuing reference to FIG. 5B, it is assumed that the terminal UE changes back to WiFi mode. As mentioned above, and in a known manner, this reattachment to the WiFi network leads to an immediate subsequent REGISTER (step P6).

In the embodiment described here, if the gateway determines, in step P50, that the terminal is accessing the network in WiFi mode (PANI=WLAN), said gateway registers with the HLR during a step P60 in order that the SMS messages destined for the terminal UE are again routed to said gateway. To this end, it sends a configuration message MAP AnyTimeModificationRequest to activate its address in the HLR for the messages destined for the terminal UE whose MSISDN corresponds to the AoR field.

Figure 6:
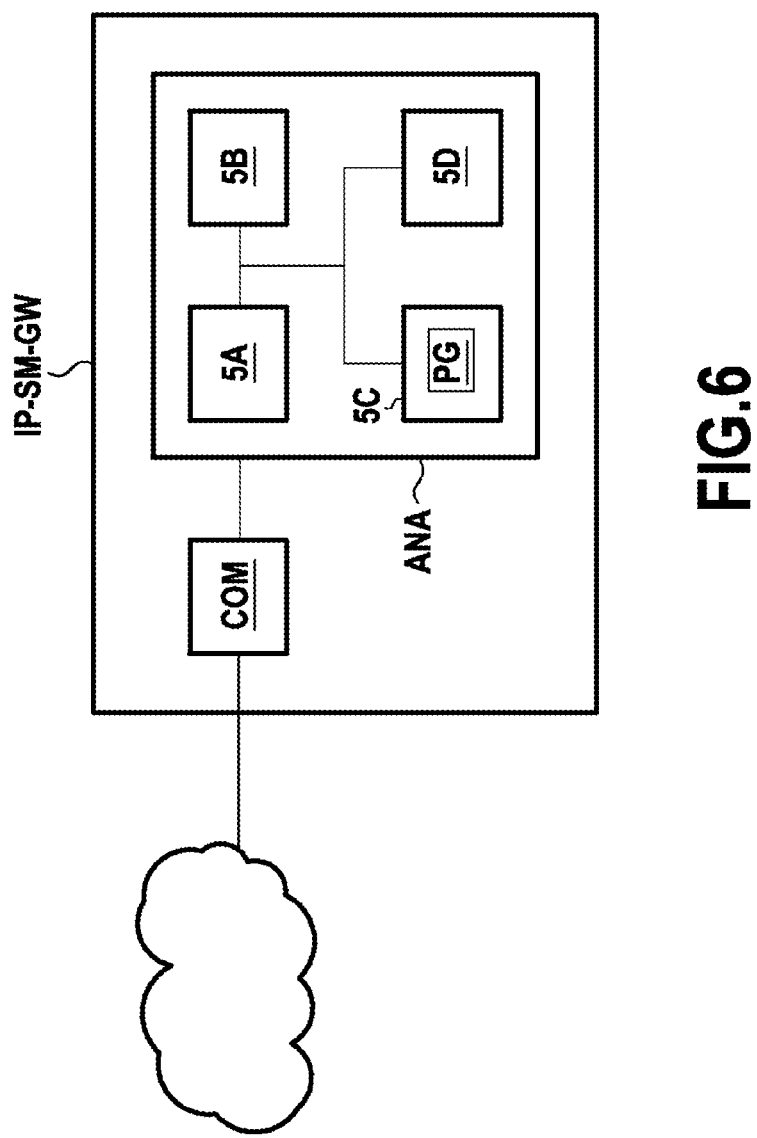
FIG. 6 shows the hardware architecture of a gateway according to one particular embodiment of the invention.

FIG. 6 shows the hardware architecture of a gateway IP-SM-GW according to one embodiment of the invention.

This platform includes a communication module COM that enables the platform to transmit and receive messages to and from other entities through a communication network. These communication means are suitable in particular for communicating with an S-SCSF entity and an HLR entity in accordance with SIP protocol and with MAP protocol. In particular, they allow the gateway to receive Third Party Registration frames from an S-CSCF and to transmit MAP AnyTimeModification messages to an HLR.

In the embodiment described here, the gateway IP-SM-GW has the hardware architecture of a computer. It includes an analysis module (ANA) comprising a processor 5A, a random-access memory 5B, a read-only memory 5C and a non-volatile flash memory 5D. The read-only memory 5C constitutes a recording carrier according to the invention, readable by the processor 5A and on which there is recorded a computer program according to the invention, including instructions for executing the steps of an SMS message management method according to the invention, which steps were described above with reference to FIGS. 5A and 5B.

The invention claimed is:

1. An SMS message management method, implemented by a gateway positioned between a serving call session control function (S-CSCF) entity and a home location register (HLR) entity in a telecommunications network, said method comprising:
receiving a Third Party Registration frame including an identifier of a terminal;
determining a type of access network to which said terminal is connected on the basis of a session initiation protocol (SIP) field, P-Access-Network-Info (PANI), included in said Third Party Registration frame; and
sending a configuration message to said HLR entity to configure whether SMS messages destined for said terminal transit or not via said gateway,
wherein the sending and content of said configuration message are determined by the gateway on the basis of said type of access network.

2. The method of claim 1, wherein said Third Party Registration frame is a frame notifying said gateway that said terminal has just registered for the first time in an International Mobile Subscriber (IMS) network core, the method comprising sending a message to register with the HLR entity only if the gateway detects that the terminal is accessing the network in WiFi mode.

3. The method of claim 1, wherein said Third Party Registration frame is a frame notifying said gateway that said terminal has just registered for the first time in an International Mobile Subscriber (IMS) network core, the method comprising sending a message to register with the HLR entity only if the gateway detects that the terminal is accessing the network in WiFi mode or in 4G mode.

4. The method of claim 1, wherein said Third Party Registration frame is a frame notifying said gateway that said terminal is reregistering in an International Mobile Subscriber (IMS) network core, the method comprising sending a message to deregister from the HLR entity if the gateway detects that the terminal is accessing the network in 2G or 3G mode.

5. The method of claim 1, wherein said Third Party Registration frame is a frame notifying said gateway that said terminal is reregistering in an International Mobile Subscriber (IMS) network core, the method comprising sending a message to register with the HLR entity only if the gateway detects that the terminal is accessing the network in WiFi mode.

6. A gateway positioned between a serving call session control function (S-CSCF) entity and a home location register (HLR) entity in a telecommunications network, said gateway comprising:
a processor; and
a non-transitory computer-readable medium comprising instructions stored thereon, which when executed by the processor configure the gateway to:
receive a Third Party Registration frame including an identifier of a terminal;
determine a type of access network to which said terminal is connected on the basis of a session initiation protocol (SIP) field, P-Access-Network-Info (PANI), included in said Third Party Registration frame; and
send a configuration message to said HLR entity to configure whether SMS messages destined for said terminal transit or not via said gateway,
wherein the sending and content of said configuration message are determined on the basis of said type of access network.

7. A non-transitory computer-readable medium on which there is recorded a computer program including instructions for executing an SMS message management method when the instructions are executed by a processor of a gateway positioned between a serving call session control function (S-CSCF) entity and a home location register (HLR) entity in a telecommunications network, said method including:
receiving a Third Party Registration frame including an identifier of a terminal;
determining a type of access network to which said terminal is connected on the basis of a session initiation protocol (SIP) field, P-Access-Network-Info (PANI), included in said Third Party Registration frame; and
sending a configuration message to said HLR entity to configure whether SMS messages destined for said terminal transit or not via said gateway, wherein the sending and content of said configuration message are determined on the basis of said type of access network.

8. The gateway of claim 6, wherein said Third Party Registration frame is a frame notifying said gateway that said terminal has just registered for the first time in an International Mobile Subscriber (IMS) network core, and wherein the instructions configure said gateway to send a message to register with the HLR entity only if the gateway detects that the terminal is accessing the network in WiFi mode.

9. The gateway of claim 6, wherein said Third Party Registration frame is a frame notifying said gateway that said terminal has just registered for the first time in an International Mobile Subscriber (IMS) network core, and wherein the instructions configure said gateway to send a message to register with the HLR entity only if the gateway detects that the terminal is accessing the network in WiFi mode or in 4G mode.

10. The gateway of claim 6, wherein said Third Party Registration frame is a frame notifying said gateway that said terminal is reregistering in an International Mobile Subscriber (IMS) network core, and wherein the instructions configure said gateway to send a message to deregister from the HLR entity if the gateway detects that the terminal is accessing the network in 2G or 3G mode.

11. The gateway of claim 6, wherein said Third Party Registration frame is a frame notifying said gateway that said terminal is reregistering in an International Mobile Subscriber (IMS) network core, and wherein the instructions configure said gateway to send a message to register with the HLR entity only if the gateway detects that the terminal is accessing the network in WiFi mode.

12. The non-transitory computer-readable medium of claim 7, wherein said Third Party Registration frame is a frame notifying said gateway that said terminal has just registered for the first time in an International Mobile Subscriber (IMS) network core, the method comprising said gateway sending a message to register with the HLR entity only if the gateway detects that the terminal is accessing the network in WiFi mode.

13. The non-transitory computer-readable medium of claim 7, wherein said Third Party Registration frame is a frame notifying said gateway that said terminal has just registered for the first time in an International Mobile Subscriber (IMS) network core, the method comprising sending a message to register with the HLR entity only if the gateway detects that the terminal is accessing the network in WiFi mode or in 4G mode.

14. The non-transitory computer-readable medium of claim 7, wherein said Third Party Registration frame is a frame notifying said gateway that said terminal is reregistering in an International Mobile Subscriber (IMS) network core, the method comprising sending a message to deregister from the HLR entity if the gateway detects that the terminal is accessing the network in 2G or 3G mode.

15. The non-transitory computer-readable medium of claim 7, wherein said Third Party Registration frame is a frame notifying said gateway that said terminal is reregistering in an International Mobile Subscriber (IMS) network core, the method comprising sending a message to register with the HLR entity only if the gateway detects that the terminal is accessing the network in WiFi mode.

* * * * *